US009381700B2

(12) United States Patent
Lazzaroni

(10) Patent No.: US 9,381,700 B2
(45) Date of Patent: Jul. 5, 2016

(54) TAPE DISPENSER WITH IMPROVED WETTING SYSTEM

(71) Applicant: Intertape Polymer Corp., Bradenton, FL (US)

(72) Inventor: Mike E. Lazzaroni, Riverview, FL (US)

(73) Assignee: INTERTAPE POLYMER CORP., Sarasota, FL (US)

( * ) Notice: Subject to any disclaimer, the term of this patent is extended or adjusted under 35 U.S.C. 154(b) by 236 days.

(21) Appl. No.: 13/951,566

(22) Filed: Jul. 26, 2013

(65) Prior Publication Data

US 2014/0026810 A1 Jan. 30, 2014

Related U.S. Application Data

(60) Provisional application No. 61/675,891, filed on Jul. 26, 2012, provisional application No. 61/754,666, filed on Jan. 21, 2013, provisional application No. 61/784,634, filed on Mar. 14, 2013.

(51) Int. Cl.

| B65C 9/22 | (2006.01) |
|---|---|
| B65C 11/04 | (2006.01) |
| B29C 65/50 | (2006.01) |
| B65H 71/00 | (2006.01) |
| B65B 51/06 | (2006.01) |
| B65H 35/00 | (2006.01) |

(52) U.S. Cl.
CPC ............ *B29C 65/5092* (2013.01); *B65B 51/067* (2013.01); *B65H 35/0046* (2013.01); *B65H 71/00* (2013.01)

(58) Field of Classification Search
USPC ...................... 156/305, 578, 307.3
See application file for complete search history.

(56) References Cited

U.S. PATENT DOCUMENTS

| 1,653,647 A | 12/1927 | Malocsay |
| 2,506,262 A | 5/1950 | Arvidson et al. |
| 2,838,195 A | 6/1958 | Zito |
| 3,076,587 A | 2/1963 | Krueger |

(Continued)

FOREIGN PATENT DOCUMENTS

WO 93/19931 10/1993

OTHER PUBLICATIONS

Interpack Packaging Systems, TWA 1000-E, Electric Water Activated Taper, Operation Manual & Parts Lists (at least as of Jun. 13, 2012).

(Continued)

*Primary Examiner* — Sing P Chan
(74) *Attorney, Agent, or Firm* — Thompson Hine LLP

(57) ABSTRACT

Tape dispensers with an improved wetting system are disclosed. The tape dispensers include a holder for a roll of liquid-activatable tape, a wetting system that has a reservoir of liquid and a roller having an absorbable outer surface to absorb and dispense liquid, and a feeding mechanism that operatively feeds the liquid-activatable tape through the wetting system to wet the adhesive on the liquid-activatable tape. The roller is at least partially immersed in the reservoir of liquid and the wetting system includes a roller adjustment mechanism to simultaneously adjust an upward force applied by the roller to the liquid activated tape and an immersion depth of the roller into the reservoir of liquid. The wetting system may also include a pressure mechanism to adjust a downward force applied to the liquid activated tape as it passes over the roller.

20 Claims, 7 Drawing Sheets

(56) References Cited

U.S. PATENT DOCUMENTS

| | | | |
|---|---|---|---|
| 3,297,510 A | | 1/1967 | Du Broff |
| 3,300,363 A | | 1/1967 | Burroughs |
| 4,221,619 A | * | 9/1980 | Lemons ............... 156/71 |
| 4,287,649 A | * | 9/1981 | Kohler ............... 492/56 |
| 4,756,065 A | * | 7/1988 | Carlson ............. B29D 99/0035 492/56 |
| 5,188,271 A | * | 2/1993 | Dannatt ............ G07B 17/00508 226/102 |
| 5,374,326 A | * | 12/1994 | Marchetti ............... 156/468 |
| 5,507,907 A | | 4/1996 | Kropp |
| 5,551,648 A | | 9/1996 | Vodoor |
| 6,474,392 B1 | | 11/2002 | Lay et al. |
| 6,558,467 B1 | | 5/2003 | Lay et al. |
| 8,061,919 B2 | | 11/2011 | Alarcon Grajeda |
| 2003/0074760 A1 | * | 4/2003 | Keller ............... B05C 17/0207 15/230.11 |
| 2005/0176834 A1 | * | 8/2005 | Hintz ............... A61L 15/425 521/50 |
| 2012/0090791 A1 | | 4/2012 | Blanchfield |

OTHER PUBLICATIONS

International Search Report and Written Opinion, PCT/US2013/52175 (Dec. 16, 2013).

Interpack Carton Sealers, USA 2024-SB, Metric, Serial Number Starting by TM094 or TM 594, Operation Manual & Parts Lists (at least as early as Sep. 6, 2012).

Old Rare Heavy All Porcelain the Adsealit Sealer Store Tape Dispenser W/ Roller, http://ebay.com/itm/OLD-RARE- HEAVY-ALL-PORCELAIN-THE-ADSEALIT-SE . . . (at least as early as Dec. 14, 2012).

* cited by examiner

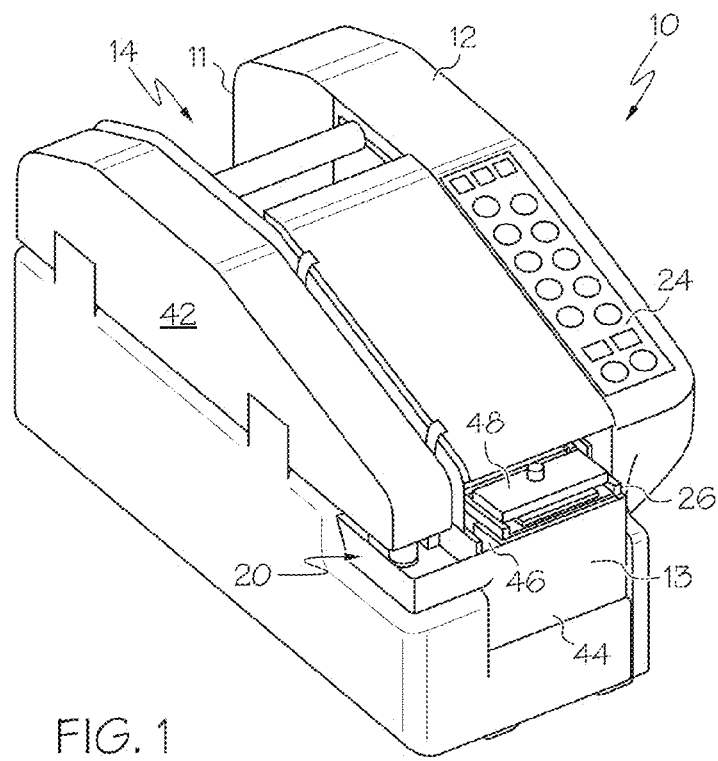
FIG. 1
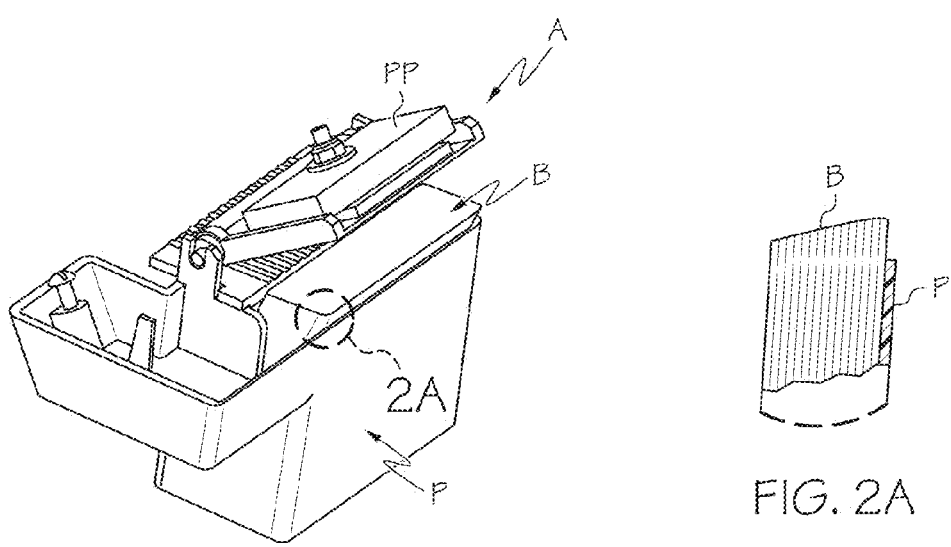
FIG. 2
(PRIOR ART)
FIG. 2A

TAPE DISPENSER WITH IMPROVED WETTING SYSTEM

RELATED APPLICATIONS

This application claims the benefit of U.S. Provisional Application No. 61/675,891, filed Jul. 26, 2012, U.S. Provisional Application No. 61/754,666, filed Jan. 21, 2013, and U.S. Provisional Application No. 61/784,634, filed Mar. 14, 2013, the entire content of each said provisional application is incorporated by reference herein.

FIELD OF THE INVENTION

The present invention relates to tape dispensers, more particularly tape dispensers for water activated tapes having an improved wetting system.

BACKGROUND OF THE INVENTION

Some tape dispensers are designed to dispense pre-determined lengths of pre-moistened water activated or gummed carton sealing tapes. Once a strip of tape is dispensed it can be manually applied to the top and/or bottom center seam of corrugated cartons. Additionally, automatic carton sealing machines may dispense pre-determine lengths of pre-moistened water activated or gummed carton sealing tapes, which that machine automatically applies to the carton. These automated machines may apply tape to one side of the carton or to both sides of the carton. Regardless of the machine being automated or manual, free-standing or a table top machine, the tape's adhesive is typically moistened by a brush as the water activated tape passes over the brush. The brush applicator has been around for a long time in the tape industry. Many have tried to find a replacement for the brush, but have failed to be successful. The problems with the brush is that it acquires a layer of adhesive transferred from the tape to the brush during the wetting process. This creates myriad issues: (1) the tape is more likely to adhere to the brush, which can cause the tape to jam; (2) the adhesive, when moistened, transfers residue to the water tank that houses the brush and to other portions of the wetting system; (3) adhesive build-up on the brush interferes with the wicking action upon which the brush dispenses water to the tape; and (4) adhesive build-up on the brush can create streaks in the adhesive on the tape, which can decrease adherence of the tape. Specifically, on reinforced tapes the adhesive is heavier, and during dispensing some of this wipes off on the brushes and runs into the water tank.

Accordingly, preventative maintenance is required to disassemble the wetting system and wash the components with warm soapy water on a regular basis. Depending on the volume of tape dispensed the brush may require maintenance every couple of days or weekly. For some dispensers, weekly washing of the brush is recommended by the manufacturer. If the dispenser is not washed weekly, the glue may accumulate and reduce the effectiveness of the moistening system by clogging the brush. On long runs the wetness of the brush is depleted, which decreases the effectiveness and/or evenness of the moistening of the tape. Moreover, the brushes are expensive to replace.

Maintenance of the dispensing machine to clean or replace the brush is expensive because of the lost production time. Accordingly, improved wetting systems are being sought after that provide a more durable moisture applicator, cheaper replacement costs, longer time periods between preventative maintenance (cleaning), and one that preferably dose not adhere to the adhesive.

SUMMARY OF THE INVENTION

In one aspect, tape dispensers are disclosed that have an improved wetting system. The tape dispensers include a holder for a roll of liquid-activatable tape, a wetting system that has a reservoir of liquid and a roller having an absorbable outer surface to absorb and dispense liquid, and a feeding mechanism that operatively feeds the liquid-activatable tape through the wetting system to wet the adhesive on the liquid-activatable tape. The roller is at least partially immersed in the reservoir of liquid and the wetting system includes a roller adjustment mechanism configured to simultaneously adjust an upward force applied by the roller to the liquid activated tape and an immersion depth of the roller into the reservoir of liquid. The wetting system may also include a pressure mechanism to adjust a downward force applied to the liquid activated tape as it passes over the roller.

In one embodiment, the tape dispenser is a table top machine. In another embodiment, the tape dispenser is an automated carton sealing machine.

In another aspect tape dispensers are disclosed that have an improved wetting system. The tape dispensers include a housing defining a storage position for a roll of liquid activated tape, a feeding mechanism within the housing that operatively feeds the liquid activated tape from its storage position to an improved wetting system. The wetting system includes an upper mechanism to adjust the downward force applied to the liquid activated tape, and a lower mechanism to adjust the upward force applied to the liquid activated tape and simultaneously adjust the depth that a liquid dispenser is immersed in a liquid. The liquid dispenser may be a wetting roller.

BRIEF DESCRIPTION OF THE DRAWINGS

FIG. 1 is a perspective view of one embodiment of a tape dispenser.

FIG. 2 is a side perspective view of a prior art wetting mechanism that includes a brush.

FIG. 2A is an enlarged view of the portion of the wetting mechanism within the circle in FIG. 2.

DETAILED DESCRIPTION

Figure 3:
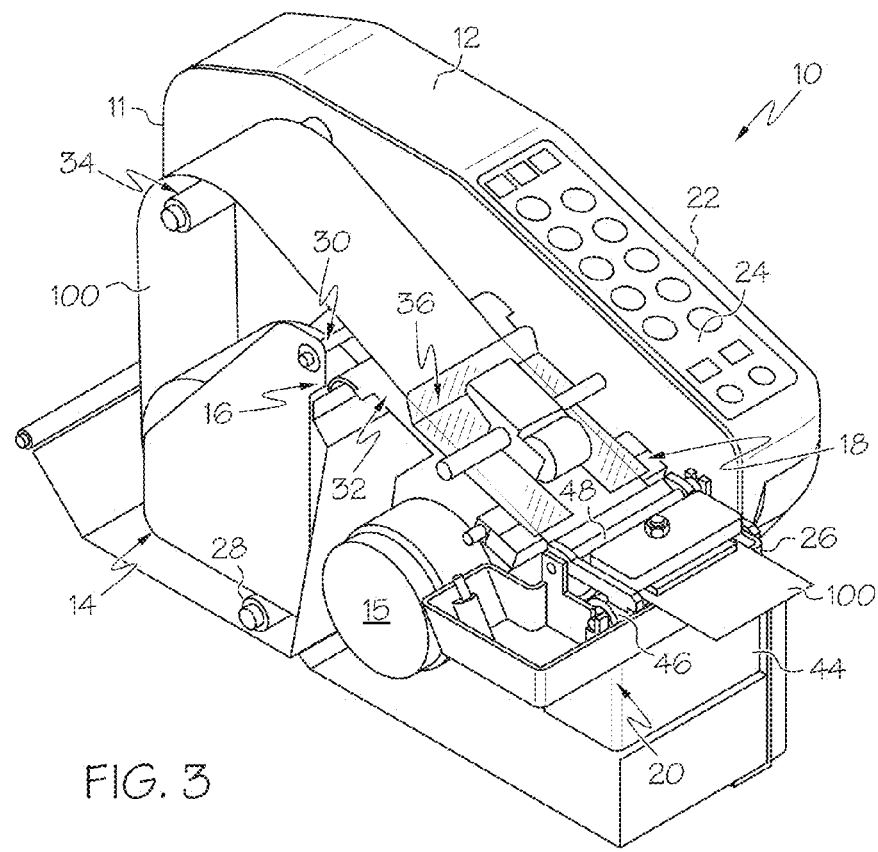
FIG. 3 is a side perspective view of one embodiment of a tape dispenser with a portion of the housing removed such that the inner workings of the tape dispenser are shown.

The following detailed description will illustrate the general principles of the invention, examples of which are additionally illustrated in the accompanying drawings. In the drawings, like reference numbers indicate identical or functionally similar elements.

As used herein "liquid activated tape" means any water activated tapes, gummed paper tapes or gummed tapes, or other tape having an adhesive on at least one major surface thereof ("the adhesive side") that is activated upon the application of a liquid thereto because the adhesive is of a kind that becomes tacky when moistened. The liquid may be water, but is not limited thereto. The liquid activated tape may be a reinforced tape or a plain tape.

Figure 4:
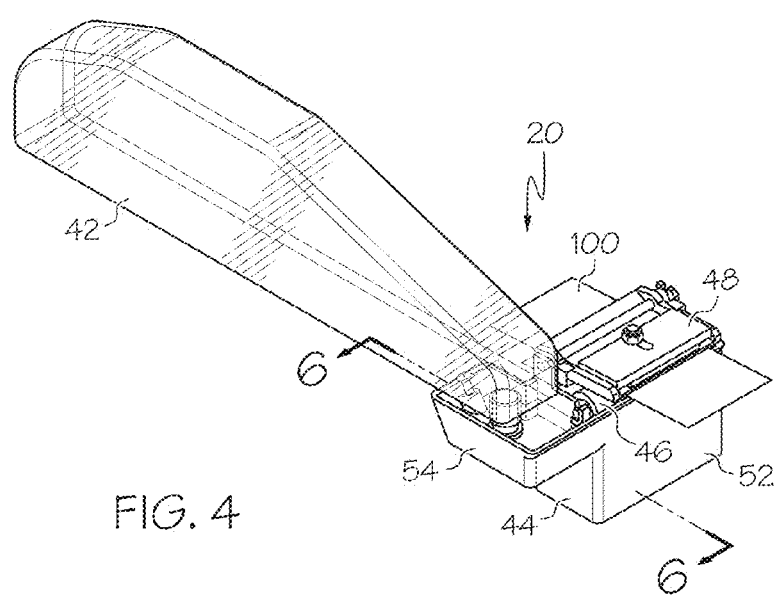
FIG. 4 is a side perspective view of one embodiment of an improved wetting system for a tape dispenser.
Figure 5:
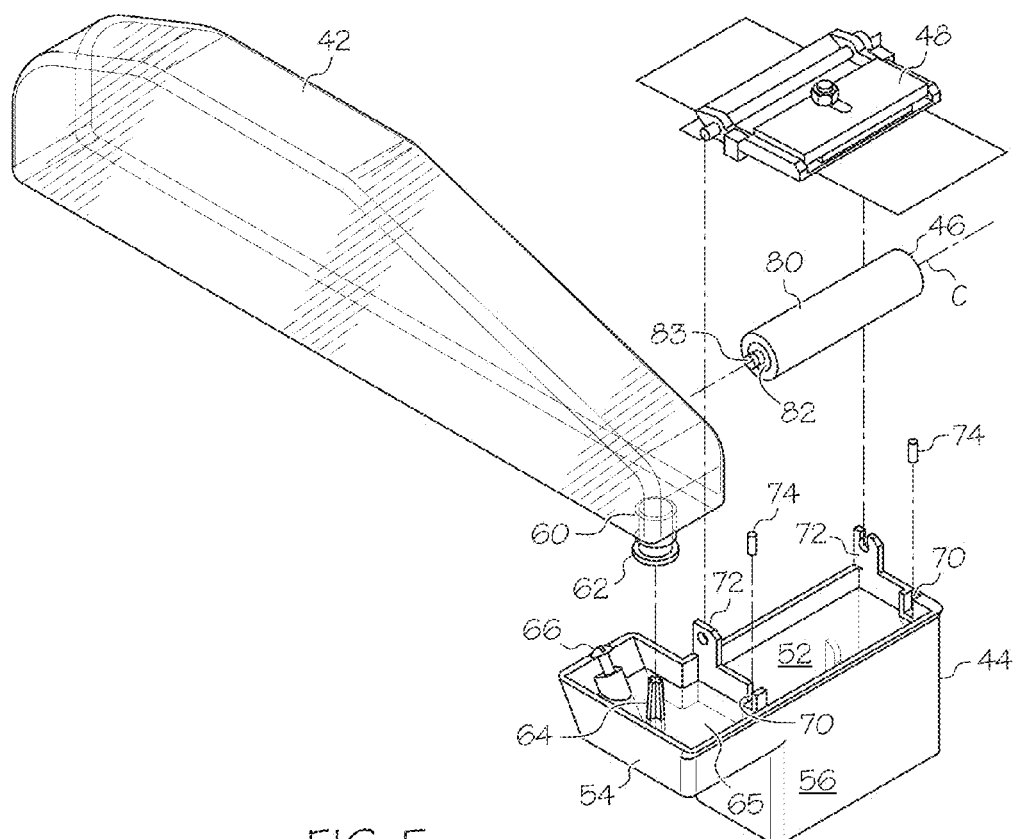
FIG. 5 is an exploded view of the wetting system illustrated in FIG. 4.
Figure 6:
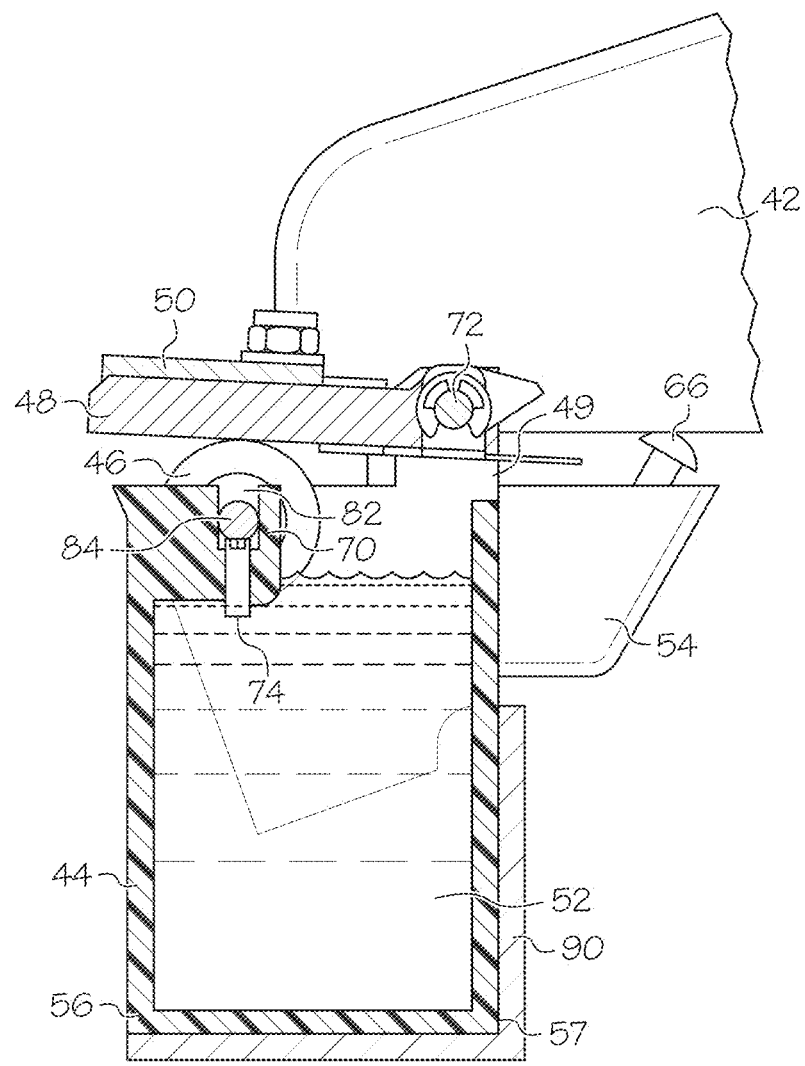
FIG. 6 is a cross-sectional view of the wetting system of FIG. 4 taken alone line 6-6.

The improved wetting system 20 disclosed herein and best illustrated in FIGS. 4-6, may be used in any type of tape dispenser, including, but not limited to, manually operated and automatic table top machines, and manually operated or automatic carton sealing machines. The wetting system 20 provides much longer operation of such machines without the need to clean the wetting system or perform maintenance thereto. Current machines using the improved wetting system 20 have run for over 90 days without requiring maintenance, cleaning, or replacement of the wetting roller 46, and much longer run times are expected after the filing of this application. This is a significant increase over the daily or weekly maintenance required of the prior art brushes. The improvement is a result of the roller being able to rinse itself off after contacting the adhesive on the liquid activated tape as it rolls into and out of the reservoir. In one embodiment, the feeding of a tape into contact with the roller within a tape dispenser provides the activation to rotate the wetting roller. Additionally, the absorbable outer surface of the roller is less susceptible to the adhesion of the adhesive from the tape than the previously used brushes.

One type of tape dispenser, which can benefit from the improved wetting system, is the tape dispenser 10 illustrated in FIG. 1. The tape dispenser 10 includes a housing 12, a storage position 14 defined in the housing 12, a user interface 24, and a wetting system 20 that includes a reservoir 42, a vessel 44, a wetting roller 46, and a pressure plate 48. The storage position 14 is generally toward the rear 11 of the tape dispenser 10 and the majority of the wetting system is located generally toward the front 13. The housing 12 and the wetting system 20 define an exit 26 through which tape can be dispensed.

FIG. 2 illustrate a prior art wetting system A that uses a moistening brush B seated in a brush pot P with a pressure plate PP mounted to the brush pot P. The pressure plate PP presses tape down onto the moistening brush B as it is fed therebetween. This type of wetting system suffers from the problems discussed in the background above.

The improved wetting system described herein overcomes the problems experienced by the brush of FIG. 2. Rather than a brush, the improved wetting system 20 includes a wetting roller 46 (as shown in FIGS. 3-6) as the applicator of the moisture to the tape's adhesive. The advantages of the wetting roller over the brush includes reduced or no adhesion of the adhesive of the tape to the roller, which reduces the maintenance required of the dispenser, improved durability (including a longer life), reduced replacement costs, and improved evenness of the wetting of the adhesive side of the tape. The improved wetting system 20 is described below.

With reference now to FIG. 3, the tape dispenser 10 generally comprises a housing 12, a storage position 14, a tape feeding mechanism 16, a cutting section 18, and a wetting system 20. The feeding mechanism 16, cutting section 18, and wetting system 20 are mounted to and/or within the housing 12. The tape dispenser 10 has an exit 26 through which tape 100 is dispensed. The tape is stored in the storage position 14, but the feeding mechanism 16 draws the tape therefrom and feeds the tape past the cutting section 18, and wetting system 20 (which defines at least a portion of the exit 26) through which the tape is dispensed from the apparatus. The tape is cut at the cutting section 18. The wetting system 20 wets the tape to activate the liquid activated adhesive. Preferably, the tape dispenser 10 includes a programmable controller 22 (housed within housing 12 and not actually visible in the figures) controllably connected to the feeding mechanism 16, cutting section 18, and wetting system 20 of the apparatus 10. A user interface 24 is provided to allow a user to interface with controller 22. In the preferred embodiment, the user interface 24 has function keys, used by the user to input commands, such as for example, "Start/Stop", and identifying the dispensed tape lengths, to the controller 22. In alternate embodiments, the user interface may use any other input means such as a touch display, or PC keyboard for entering commands in the controller.

Still referring to FIG. 3, the storage position 14 is, preferably, sized and shaped to hold a roll of tape. The roll is positioned vertically in the housing. In alternate embodiments, the tape may be stored in the storage area in any other suitable configuration. The storage position 14 is provided with support roller 28 which supports the tape roll stored therein. The roller configuration shown in FIG. 3 is merely for example purposes, and the support roller(s) may be arranged in any other suitable configuration. The support roller 28 is disposed to aid relatively unencumbered rotation of the tape roll when the feed mechanism 16 draws tape out of the storage area 14.

The feeding mechanism 16 generally comprises one or more idler rollers 30, guide plate 32, feed roller 34, pinch roller 36, and drive motor 15. The idler roller 30 (only one idler roller 30 is shown in FIG. 3 for example purposes) are located between the feed roller 36 and the pinch roller 36. The idler roller 30 supports and guides the tape in the feed direction. As shown in FIG. 3, one or more guide plates 32 are mounted to or within the housing 12, and are shaped and orientated such that the tape riding upon the guide tray 32 is orientated true to the feed direction and aligned for entry into the cutting section 18 and the wetting system 20. This prevents the tape from being skewed or twisted. Feed roller 34 is preferably located towards the rear 11 of the apparatus 10. The feed roller 34 is drivingly connected to electric motor 15 by suitable transmission means (not shown) such as a belt, or chain drive. When the electric motor 15 is energized, under control from controller 22, the motor rotates the feed roller 34 in a suitable direction (e.g. clockwise) to transport the tape is the feed direction toward the exit 26. Friction contact between the feed roller 34 and the tape causes the tape to move when the feed roller turns. Friction contact between the tape and feed roller 34 is enhanced in the preferred embodiment by pinch roller 36 which is located on the opposite side of the tape from the feed roller 34. When in the engaged position, shown in FIG. 3, (the pinch roller also has a disengaged position as will be described below) the pinch roller 36 presses the tape against the feed roller 34 thereby increasing the friction force between roller and tape. In the preferred embodiment, the feed roller 34 is connected to a counter (not shown) which can indicate the rotation of the feed roller, and hence, the amount of tape being fed, to the controller 22. The feeding mechanism 16 described above and shown in FIG. 3, is merely one example of a suitable feeding mechanism which may be used in the tape dispensing apparatus of the present invention. The present invention is equally applicable to dispensing apparatus having any other suitable feeding mechanism such as for example a manually operated feeding mechanism.

Still referring to FIG. 3, the cutting section 18 of the apparatus 10 has a cutting mechanism (not shown). The cutting mechanism, which is operated by controller 22 to cut the tape fed past the cutting section 18, generally comprises a strike plate and a cutting blade. The cutting mechanism may include any known or hereinafter developed configuration.

Referring now to FIGS. 4-6, the improved wetting system 20 incorporated into tape dispenser 10 generally comprises a fluid reservoir or bottle 42, a vessel 44, a liquid dispenser such as a wetting roller 46, and a pressure plate 48. Vessel 44 generally mounts to or is seated at the front 13 of housing 12, and is open at the top as seen in FIGS. 1 and 3. The vessel 44 and the reservoir 42 hold a suitable liquid, such as for example, water for activating the moisture/liquid activated adhesive on the tape dispensed from the tape dispenser. The bottle 42 (FIGS. 4-6) feeds the reserve liquid into the vessel 44 at a suitable rate to replenish the liquid therein. In the preferred embodiment, the reserve bottle 42 is removable, which beneficially allows the bottle 42 to be refilled at suitable times without interrupting operation of the tape dispensing apparatus. In one embodiment, the bottle 42 is mounted external to the housing 12 such that the bottle 42 is easily removable and refillable. As labeled in FIG. 5, bottle 42 includes an outlet 60 having a valve 62 The valve 62 may be or include a flexible material such as rubber and include an opening aligned with the outlet 60 that can receive a post 64 to provide controlled fluid communication between the bottle 42 and the vessel 44.

As illustrated in FIGS. 4-6, vessel 44 includes a deep well portion 52 and a shallow well portion 54 in fluid communication with the deep well portion 52. Referring now to FIG. 5, the shallow well portion 54 has a post 64 extending upward from its interior bottom 65. The post 64 may have one or more longitudinally extending grooves in its exterior surface to allow liquid to flow in the grooves. The post 64 is designed to be received in the valve 62 of the bottle 42 to place the bottle 42 into fluid communication with the shallow portion 54 of the vessel 44. In one embodiment, post 64 may have a cross-section transverse to its longitudinal axis that is generally shaped as a plus sign.

The shallow well portion 54 also includes an adjustment screw 66 mounted therein and positioned to contact the bottle 42 as seen in FIGS. 5 and 6. The adjustment screw 66 provides an adjustment mechanism for the liquid level within vessel 44.

The deep well portion 52 includes a first mount 70 for the liquid dispenser 46 (in FIGS. 4-6, illustrated as a wetting roller) and a second mount 72 for the pressure plate 48. First mount 70 is positioned more proximate the front 56 of the vessel 44 and second mount 72 is positioned more proximate the rear 57 of the vessel 44. When the wetting roller 46 is seated in the first mount 70 and the pressure plate 48 is attached to second mount 72, the pressure plate 48 is positioned above the wetting roller 46 and will apply pressure (a downward force) to the liquid activated tape as it passes over the wetting roller 46. As seen in FIG. 6, the pressure plate 48 is pivotally mounted to the second mount 72 near the back edge 49 of the pressure plate such that the weight 50 attached thereto will (under gravity) direct the pressure plate toward the wetting roller.

The first mount 70 may be a left notch and a right notch, respectively, per the view illustrated in FIG. 5 relative to its position on the page. Within the first mount 70 an adjustment screw 74 may be disposed to adjust the height of the wetting roller 46 relative to the vessel 46. As illustrated in FIG. 5, there may be an adjustment screw 74 in both the left notch and the right notch. The adjustment screw(s) 74 adjust the height of the wetting roller 46 above the vessel 44 while simultaneously adjusting its immersion depth in the liquid within the vessel 44, as best seen in FIG. 6. An adjustment to the height of the wetting roller 46 also changes the amount of upward force applied to the liquid activated tape 100 by the wetting roller 46 as it passes over the roller. The immersion depth may be adjusted to apply a pre-selected amount of liquid to the adhesive side of the liquid activated tape.

The wetting roller 46 includes a wetting material 80 (FIG. 5) disposed on a shaft 82 (FIGS. 5 and 6) that extends beyond the wetting material 80 to define a first shaft end 83 (FIG. 5) and a second shaft end 84 (FIG. 6). The first shaft end 83 may be seated in the left notch 70 (left, FIG. 5) and the second shaft end 84 may be seated in the right notch 70 (right, FIG. 5) when the wetting roller 46 is connected to the vessel 44 for rotation relative thereto. As illustrated in the figures, in particular FIG. 5, in one embodiment the wetting roller 46 is a cylindrical roller having a first shaft end 83 and a second shaft end 84. As the tape 100 is fed through the tape dispenser 10 it causes the wetting roller 46 to rotate, which will apply the liquid to the adhesive side of the tape.

The wetting material 80 may be or include any suitable material to allow fluid to be drawn, by capillary action, along its surface area from the liquid in the deep well portion 52 of the vessel 44. In another embodiment, the wetting material may be or include an open cell foam adhered to a shaft. The open cell foam may be adhered to the shaft by a polyvinyl acetate adhesive. The open cell foam is able to absorb the liquid in the vessel 44 and transfer the liquid to the tape. In one embodiment, the open cell foam is or includes an acrylic material, a nylon material, a cellulose material, a vinyl material, a (poly)acrylonitrile or a derivative thereof, or a combination thereof. In another embodiment, the open cell foam is a cellulose foam.

Figure 8:
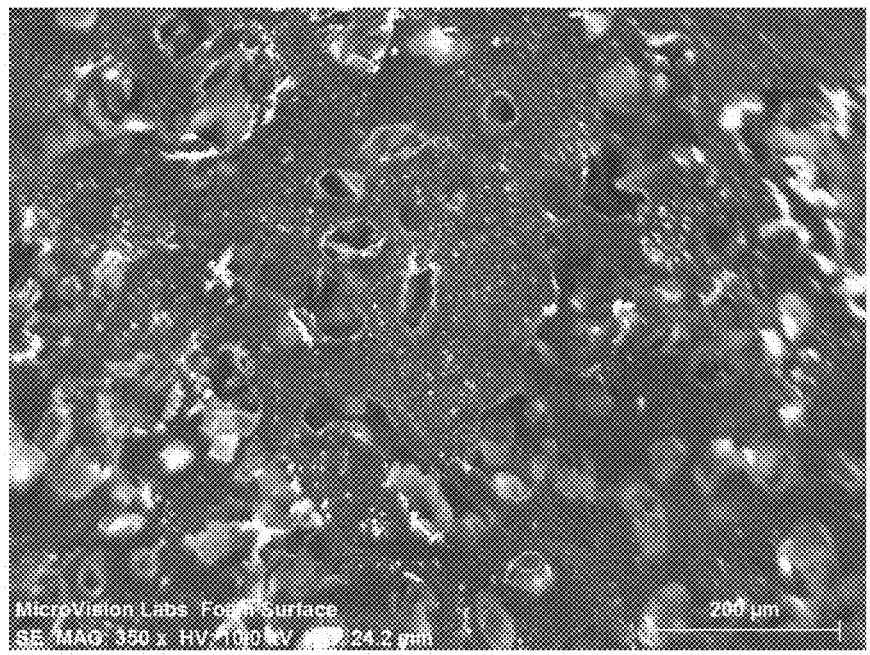
FIG. 8 is a SEM image of the surface of a cellulose foam roller at 350× magnification for use in the wetting system.
Figure 9:
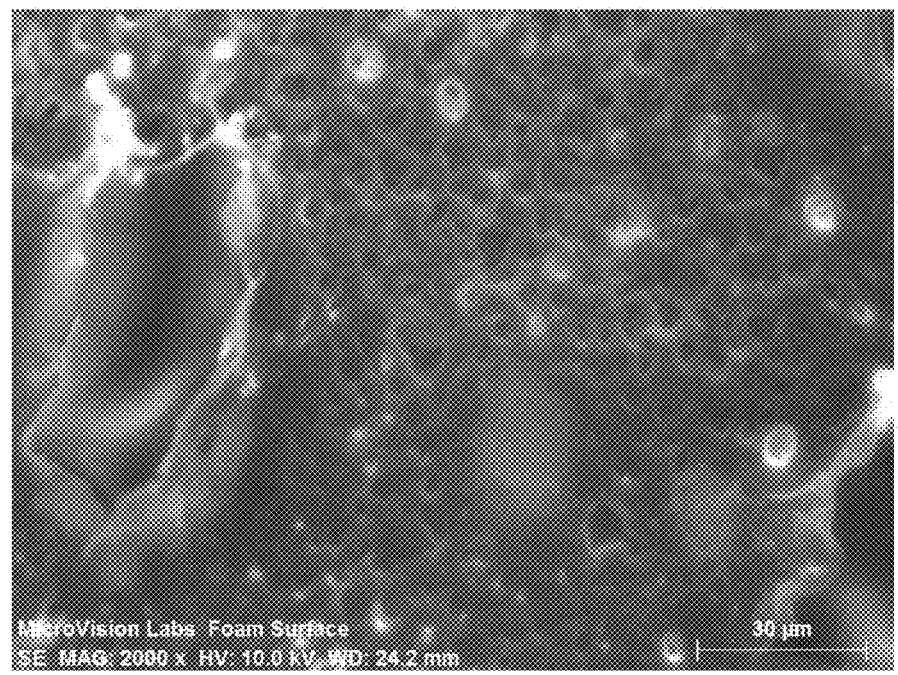
FIG. 9 is a SEM image of the surface of the cellulose foam roller of FIG. 8 but at 2000× magnification.
Figure 10:
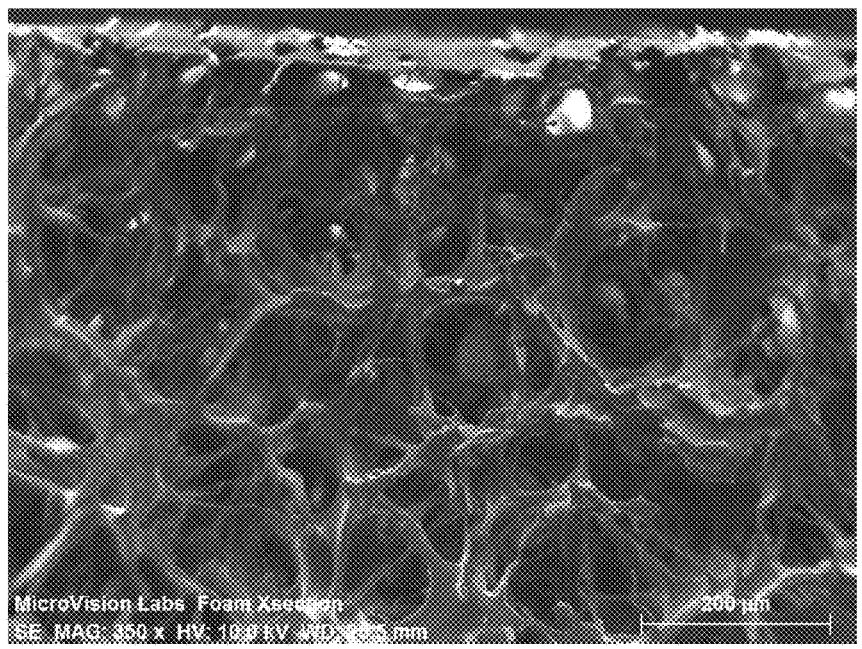
FIG. 10 is a SEM of the underlying structure of the cellulose foam roller of FIG. 8 at 350× magnification.
Figure 11:
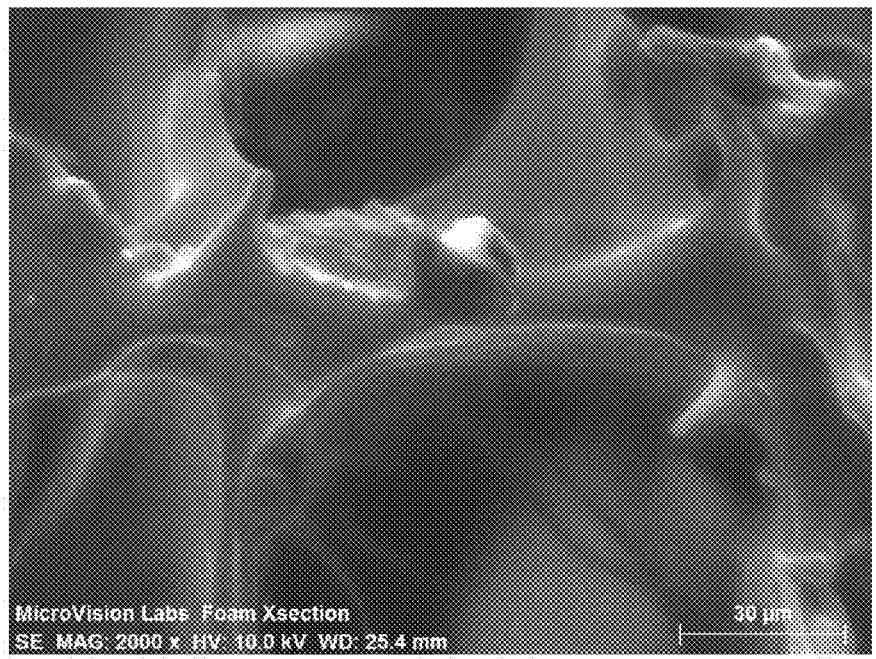
FIG. 11 is a SEM of the underlying structure of the cellulose foam roller of FIG. 8 at 2000× magnification.

Referring now to FIGS. 8-11, a cellulose foam roller used successfully in the wetting system was analyzed to understand the foam structure. As seen in FIGS. 8 and 9, the surface of the cellulose foam roller includes a plurality of small closed pore features. However, the underlying structure has an open cell pore structure as seen in FIGS. 10 and 11 that is significantly different than the surface of the foam roller shown in FIGS. 8 and 9. The structure indicates that the roller can hold a considerable amount of liquid in the underlying foam, but not release it at a rate that would be expected from the underlying pore structure. The structure of the foam roller would not allow the liquid to quickly escape and run uncontrollably. Instead, pressure likely must be applied to the roller to dispense the liquid stored in the underlying pore structure, which is advantageous for a more controlled, more uniform disbursement of the liquid from the roller.

In one embodiment, as seen in FIGS. 4 and 5, the wetting roller 46 is oriented with its central longitudinal axis C (labeled in FIG. 5) perpendicular to the feeding direction of the tape. In the assembled position of FIG. 4 it is shown that the length of the wetting roller 46 is greater than the width of the tape 100 passing thereover. This provides 100% edge to edge wetting of the tape.

Accordingly, when tape 100, fed by feeding mechanism 16, is dispensed over the wetting roller 46 (and, optionally, through exit 26 of a tape dispenser 10), the bottom surface of the tape contacts the wetting material 80 of the wetting roller 46 (under pressure applied by the pressure plate 48) to rotate the wetting roller 46 and thereby wet the tape.

In the embodiment of FIG. 6, the tape dispenser 10 may also include a heater element 90 to heat the liquid in the vessel to a temperature of about 100° F. to about 120° F., more preferable to a temperature of about 110° F. to about 115° F. The heating element 90 may be positioned below and/or beside the vessel 44. In one embodiment, the heating element 90 is a generally L-shaped bracket such that it warms both the bottom and one side of the vessel 44. Accordingly, the vessel 44 in this embodiment has at least a flat bottom surface and one flat side to mate with the L-shaped heating element.

Figure 7:
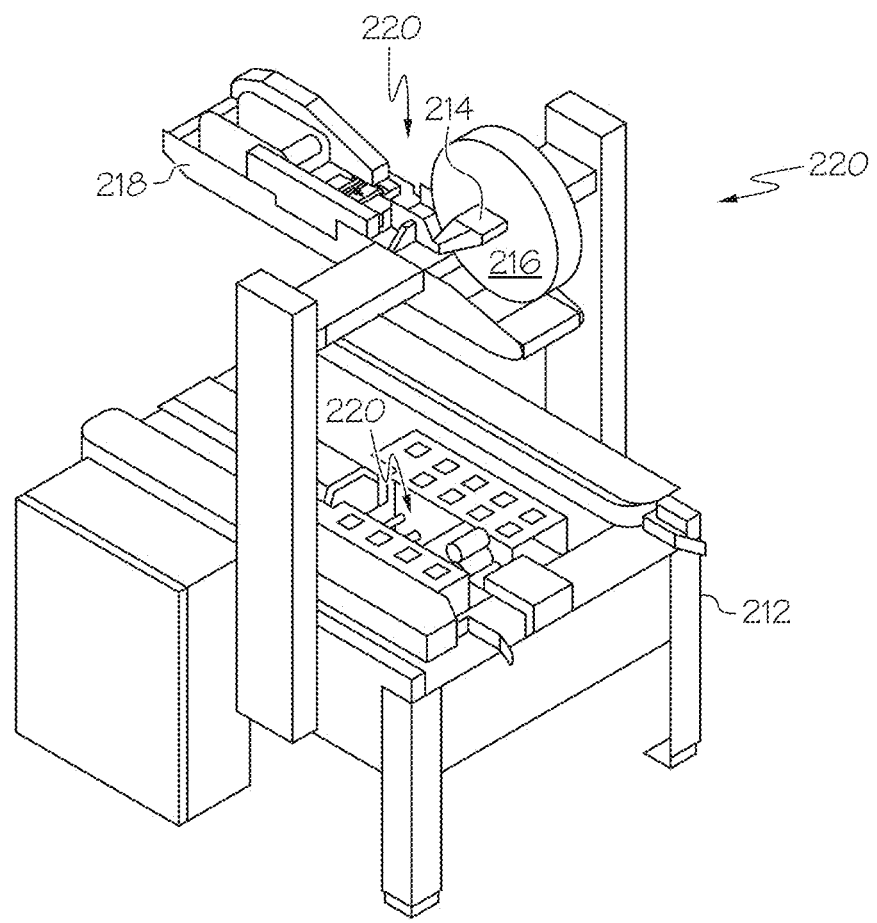
FIG. 7 is a perspective view of one embodiment of an automated carton sealing machine having the improved wetting system in both the upper arm and in the table.

Another tape dispenser, which can benefit from the improved wetting system, is an automatic carton sealing machine, such as the tape dispenser 200 illustrated in FIG. 7. The tape dispenser 200 includes a table 212, a holder 214 for a first roll of liquid activated tape 216 (and a second holder (not shown for a second roll of liquid activated tape), a first wetting system 220 in an arm 218 for dispensing the first roll of liquid activated tape to a first side of a carton (not shown) passing through the machine, and a second wetting system 222 disposed in the table and accessible to a second roll of liquid activated tape (not shown) for application to a second side of the carton (not shown). Both the first wetting system 220 and the second wetting system 222 are as described above for FIGS. 4-6, and provide all the benefits discussed above.

It will be appreciated that while the invention has been described in detail and with reference to specific embodiments, numerous modifications and variations are possible without departing from the spirit and scope of the invention as defined by the following claims.

What is claimed is:

1. A tape dispenser comprising:
a holder for a roll of liquid-activatable tape;
a wetting system comprising:
a reservoir of liquid;
a roller at least partially immersed in the reservoir of liquid, wherein the roller is an open cell foam roller having an absorbable outer surface that allows liquid to absorb into and dispense from the open cell foam, the absorbable outer surface having a cell structure different than an underlying structure of the open cell foam; and
a feeding mechanism that operatively feeds the liquid-activatable tape through the wetting system to wet the adhesive on the liquid-activatable tape.

2. The tape dispenser of claim 1, further comprising a roller adjustment mechanism configured to simultaneously adjust an upward force applied by the roller urging the roller into contact with the liquid activated tape and an immersion depth of the roller into the reservoir of liquid.

3. The tape dispenser of claim 1, wherein the wetting system further comprises a pressure mechanism to adjust a downward force applied to the liquid activated tape as it passes over the roller.

4. The tape dispenser of claim 1, further comprising a vessel housing additional liquid in fluid communication with the reservoir.

5. The tape dispenser of claim 1, wherein the absorbable outer surface of the roller includes a plurality of closed pore features for controlled disbursement of the liquid from the roller.

6. The tape dispenser of claim 1, wherein the tape dispenser is an automatic carton sealing machine having the wetting system in a table.

7. The tape dispenser of claim 6, wherein the automatic carton sealing machine includes a second wetting system in an arm positioned above the table.

8. The tape dispenser of claim 7, wherein the wetting system in the table and the second wetting system in the arm both include a pressure mechanism to adjust the force applied to the liquid activated tape, acting toward the roller, as the liquid activated tape passes over the roller.

9. A tape dispenser comprising:
a housing defining a storage position for a roll of liquid activated tape; and
a feeding mechanism within the housing that operatively feeds the liquid activated tape from its storage position to a wetting system comprising:
an upper mechanism to adjust the downward force applied to the liquid activated tape; and
a lower mechanism configured to simultaneously adjust the upward force applied to the liquid activated tape and an immersion depth of a liquid dispenser in a reservoir of liquid to be applied to the tape, wherein the liquid dispenser is an open cell foam having an absorbing outer surface that has a cell structure different than the open cell foam.

10. The tape dispenser of claim 9 wherein the upper mechanism includes a pressure plate.

11. The tape dispenser of claim 9 wherein the liquid dispenser is a wetting roller of adjustable height.

12. The tape dispenser of claim 11 wherein the lower mechanism includes a vessel having an adjustment mechanism to change the height of the wetting roller relative to the vessel.

13. The tape dispenser of claim 12, wherein the adjustment mechanism includes one or more adjustment screws to adjust the height of the wetting roller.

14. The tape dispenser of claim 13, wherein the vessel includes a left notch and a right notch each having therein one of the adjustment screws.

15. The tape dispenser of claim 12 wherein the vessel has a deep well portion comprising a mount for the wetting roller and a shallow well portion in fluid communication with the deep well portion.

16. The tape dispenser of claim 15 further comprising a liquid reservoir for filling the vessel, the liquid reservoir including an outlet having a valve, wherein the shallow well portion includes a post and the post is received in the valve of the liquid reservoir.

17. The tape dispenser of claim 15 wherein the shallow well portion includes a water level adjustment screw in contact with the liquid reservoir.

18. The tape dispenser of claim 12 wherein the vessel includes a mount for the pressure plate.

19. The tape dispenser of claim 11 wherein the open cell foam comprises one or more of an acrylic material, a nylon material, and a cellulose material.

20. The tape dispenser of claim 11 wherein the wetting roller includes the open cell foam adhered to a shaft.

* * * * *